(No Model.)

D. P. CLARK.
LEAF SPRING.

No. 374,041. Patented Nov. 29, 1887.

WITNESSES:
John A. Rennie.
Henry Carter.

INVENTOR:
Dallas P. Clark,
By his Attorney,
Wm. H. Hannerton.

UNITED STATES PATENT OFFICE.

DALLAS P. CLARK, OF JERSEY CITY, NEW JERSEY, ASSIGNOR OF ONE-HALF TO RICHARD VOSE, OF NEW YORK, N. Y.

LEAF-SPRING.

SPECIFICATION forming part of Letters Patent No. 374,041, dated November 29, 1887.

Application filed July 16, 1887. Serial No. 244,462. (No model.)

*To all whom it may concern:*

Be it known that I, DALLAS P. CLARK, a citizen of the United States, and a resident of Jersey City, county of Hudson, and State of New Jersey, have invented certain new and useful Improvements in Leaf or Half-Elliptic Springs, of which the following is a specification.

My invention is designed more especially for application to locomotive and locomotive-tender springs, although with slight modifications it may be applied to carriage and other forms of spring, and has for its object to provide improved means for securing to the ends of the longest leaf thereof the enlargements, sometimes called the "dabs," which, in the locomotive-springs, receive the upper end of the engine-supporting rods or stirrups, and in locomotive-tender springs rest upon the boxes in which the journal-bearings of the wheel-axles are formed.

Heretofore in the manufacture of springs of this class it has been the custom to secure such enlargement to the ends of the longest leaf thereof by welding. This mode of construction, while effective to the extent of securing the parts rigidly together, has been found defective in practice, principally because of the fact that in making the welds it not infrequently happens that the material out of which the leaves are made is burned, which thereby renders it exceedingly brittle, and the latter incapable of withstanding the strain put upon them in consequence thereof. As a result of this, frequent breakages of the leaves at the point of union with the enlargements occur, which not only involves delay and inconvenience, but expense as well. I have discovered that by making these enlargements of separate pieces of metal and securing them detachably to the leaves I may obviate the burning of the metal incident to the welding operation and produce a spring which, while stronger and better able to withstand the strain put upon it, admits of the removal and replacement of the enlargements when desired.

My invention therefore consists of a leaf or half-elliptic spring in which the enlargements or dabs are detachably secured thereto, all as will more fully hereinafter appear.

Figure 1:
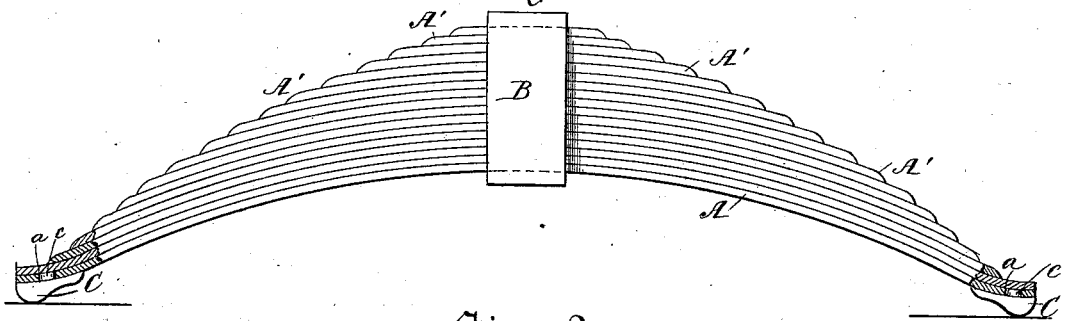
Figure 2:
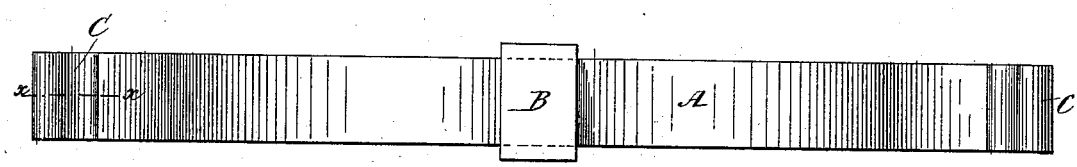
Figure 3:
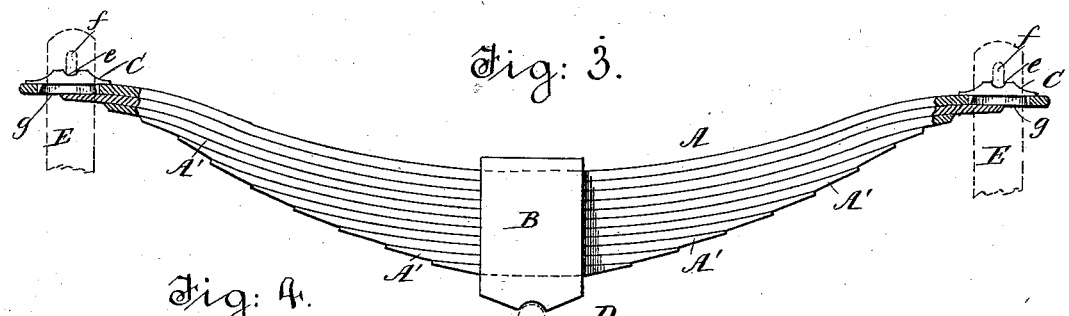
Figure 4:
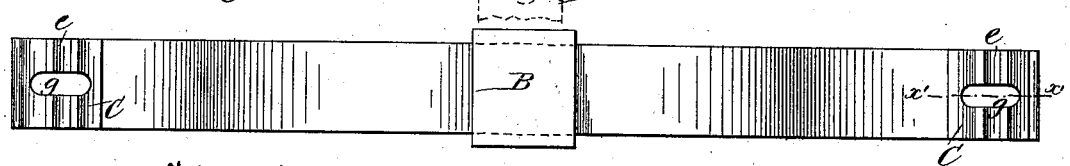

Referring to the accompanying drawings, in which my invention is represented, Figure 1 is a side elevation of a locomotive-tender springs, the ends thereof being shown in section; Fig. 2, a top view thereof; Fig. 3, a side elevation of a locomotive-spring with the ends broken away to show more clearly the manner of securing the enlargements thereto; Fig. 4, a top view of such spring; and Figs. 5 and 6, sections taken upon the lines $x\ x$ and $x'\ x'$, respectively, of Figs. 2 and 4.

In all the figures like letters designate corresponding parts.

Figure 5:
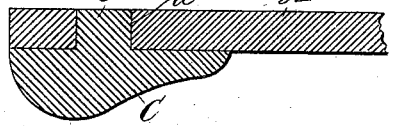
Figure 6:
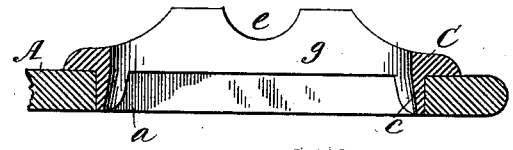

A A' indicate the leaves composing the spring, B the clip by means of which such leaves are bound together, and C C the enlargements or dabs upon the ends of the leaf A. These leaves and clip may be of any ordinary or preferred construction, as may also be the enlargements or dabs C C; but, instead of being welded fast to the ends of the leaf A, such enlargements or dabs are made detachable and are secured in place by means of a shank, $c$, upon the back of each entering an orifice, $a$, in the end of such leaf, as shown, and may be riveted therein, if so desired. In Figs. 1, 2, and 5 these enlargements or dabs are shown applied, in accordance with my invention, to the ordinary locomotive-tender spring, which are arranged to rest with their ends upon the top of the journal-boxes and receive the weight or load upon the top of the clip B, while in Figs. 3, 4, and 6 they are represented as similarly applied to the well-known locomotive-spring, which in practice is reversed and supported by its clip B upon the upper end of the saddle D, that rests upon the top of the journal-box, (not shown,) the weight or loads being applied to its ends through the intermediaries of the stirrups E E and keys $e\ e$. In the former of these springs the enlargements or dabs are preferably made solid, in order to present as great a bearing-surface to the top of the journal-boxes as is possible; but in the latter they are provided with an orifice, $g$, extending down through the same and through their shanks, for the reception of the stirrups E E, which are arranged therein and engage with the notches $e\ e$, formed in the top of such enlargements or dabs through the intermediaries of the key $ff$. The enlargements or dabs, however, are secured to the leaf A in the same manner in both instances, and may be made of the same material as such leaf, or any other that may be desired. By this construction it will be seen that I produce a spring in which not only may the enlargements or dabs be removed when they become worn or broken and replaced by others without throwing away the entire leaf to which they are secured, but which also obviates all welding of the part and the consequent danger of burning incident thereto.

While I have shown the best manner contemplated by me for securing the enlargements or dabs to the leaves of the spring to which they are applied, it is to be understood that I do not limit myself strictly thereto, as it is obvious that I may use other forms of fastening and still be within the spirit of my invention.

I am aware that it is not new to combine with leaf or half-elliptic springs, which are so arranged as to rest with the ends of one upon the ends of the other, blocks which are provided with shanks upon their upper and lower sides for engagement with apertures in the ends of such springs, to hold said springs apart, as shown, for instance, in Letters Patent No. 154,858; also, that elliptic springs having the inner leaf thereof formed from a continuous strip with re-enforcing strips secured within their ends by rivets or otherwise have heretofore been made, as illustrated in Letters Patent No. 828, and also that it is common to unite the upper and lower members of elliptic springs by means of auxiliary springs riveted to their ends, as shown in Letters Patent No. 216,352. These I do not claim. My spring differs from all of these in having the portion thereof which rests upon the journal-boxes, or which receives the load transmitted to it through the stirrups, made in separate pieces, which while forming parts of the spring itself are yet capable of being detached and being replaced by others; and it is in this respect that my spring is distinguished from all others.

Having thus described my invention and one way in which it is or may be carried into effect, what I claim as new, and desire to secure by Letters Patent of the United States, is—

1. A leaf or half-elliptic spring having the enlargements or dabs, which form a portion of the ends thereof, detachably secured thereto, substantially as described.

2. The combination, with the leaf or half-elliptic spring having orifices formed in the ends of the longest leaf thereof, of the enlargements or dabs which form portions of the ends of such springs provided with shanks upon their backs for securement in said orifices, whereby a spring is produced having the portions thereof upon which it rests or which receives the load made detachable, substantially as described.

3. The combination, with a leaf, A, provided with an orifice, $a$, in each of its ends, of the enlargements or dabs C C, which form portions of its ends, provided with shanks $c$ upon their backs for securement in said orifices, substantially as described.

4. The combination, with the leaf A, provided with the orifice $a$ in each of its ends, of the enlargements or dabs C C, each of which is provided with a shank, $c$, and the orifice $g$, as and for the purposes set forth.

In testimony whereof I have hereunto set my hand this 12th day of July, 1887.

DALLAS P. CLARK.

Witnesses:
E. P. SIMPSON,
J. C. CLARK.